(12) United States Patent
Meissner

(10) Patent No.: US 7,432,874 B2
(45) Date of Patent: Oct. 7, 2008

(54) ANTENNA ARRAY

(75) Inventor: Wolfgang Meissner, Dornburg (DE)

(73) Assignee: Feig Electronic GmbH, Weilburg-Waldhausen (DE)

( * ) Notice: Subject to any disclaimer, the term of this patent is extended or adjusted under 35 U.S.C. 154(b) by 78 days.

(21) Appl. No.: 11/186,656

(22) Filed: Jul. 21, 2005

(65) Prior Publication Data

US 2006/0017634 A1 Jan. 26, 2006

(30) Foreign Application Priority Data

Jul. 22, 2004 (DE) .................. 10 2004 035 621
Dec. 4, 2004 (EP) .................. 04028778

(51) Int. Cl.
*H01Q 21/00* (2006.01)
*H01Q 11/12* (2006.01)

(52) U.S. Cl. .................. 343/867; 343/742

(58) Field of Classification Search ......... 343/866–867, 343/742, 41, 88, 893–894, 741; 455/575; 340/572.1, 572.7, 745, 748
See application file for complete search history.

(56) References Cited

U.S. PATENT DOCUMENTS

| | | | |
|---|---|---|---|
| 5,321,412 A | | 6/1994 | Kopp et al. |
| 5,978,655 A | | 11/1999 | Ohura et al. |
| 6,094,173 A | * | 7/2000 | Nylander .................. 343/742 |
| 6,166,706 A | * | 12/2000 | Gallagher et al. .......... 343/867 |
| 6,703,935 B1 | * | 3/2004 | Chung et al. .............. 343/893 |
| 6,753,821 B2 | | 6/2004 | Yang et al. |
| 7,023,346 B2 | * | 4/2006 | Balch et al. .............. 340/572.7 |
| 7,042,413 B2 | * | 5/2006 | Mazoki et al. ............. 343/795 |
| 7,072,613 B2 | * | 7/2006 | Tanaka et al. ............. 455/13.3 |
| 2003/0052783 A1 | | 3/2003 | Sitzman |
| 2003/0112193 A1 | * | 6/2003 | Briggs ................... 343/742 |
| 2003/0174099 A1 | * | 9/2003 | Bauer et al. .............. 343/893 |
| 2004/0130442 A1 | * | 7/2004 | Breed et al. ............. 340/443 |
| 2004/0201539 A1 | * | 10/2004 | Yewen ................... 343/867 |

FOREIGN PATENT DOCUMENTS

| | | |
|---|---|---|
| DE | 299 21 752 U1 | 8/2000 |
| DE | 201 10 926 U1 | 10/2001 |
| DE | 100 56 176 C1 | 10/2002 |
| EP | 1 298 573 | 6/1969 |
| EP | 0 186 483 | 7/1986 |
| EP | 0 645 840 | 3/1995 |
| JP | 08222936 | 8/1996 |
| WO | WO 03/026067 | 3/2003 |
| WO | WO 03/090310 | 10/2003 |

* cited by examiner

*Primary Examiner*—Huedung Mancuso
(74) *Attorney, Agent, or Firm*—Collard & Roe, P.C.

(57) ABSTRACT

An antenna array for RFID antennas for large cohesive detection spaces, having an operating frequency between 100 kHz and 30 MHz. This antenna array can be connected with at least one reader. There can be at least one antenna consisting of an antenna loop having at least one winding. The antenna array can include at least two antennas that are disposed in a plane, in such a manner that the antenna loops of the individual antennas overlap. With this design, at least one multiplexer can be disposed between the at least one reader and the antennas of the antenna array, for selected activation of the antennas.

16 Claims, 19 Drawing Sheets

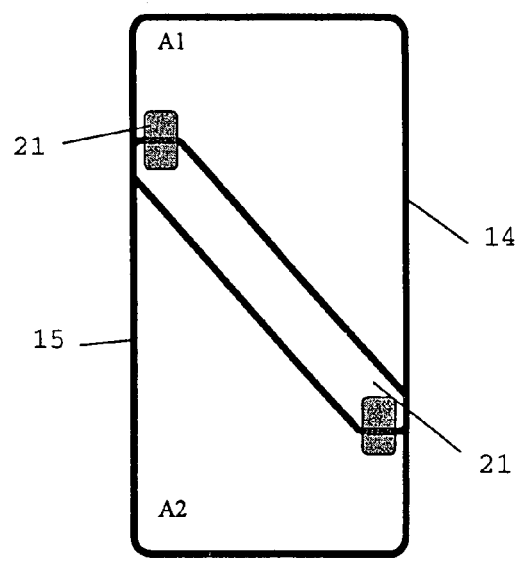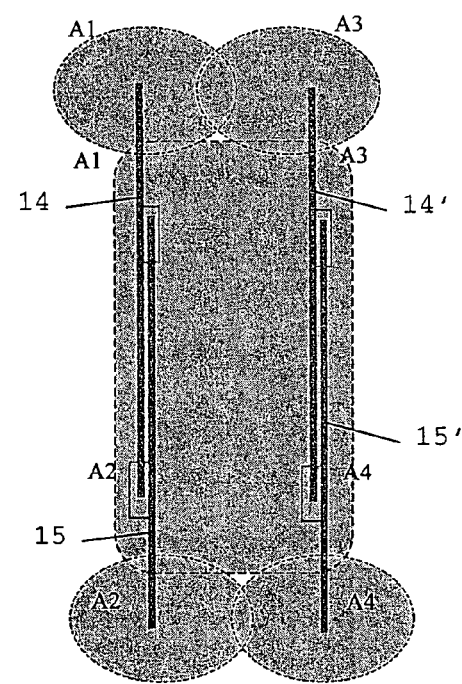
Fig. 13a                    Fig. 13b

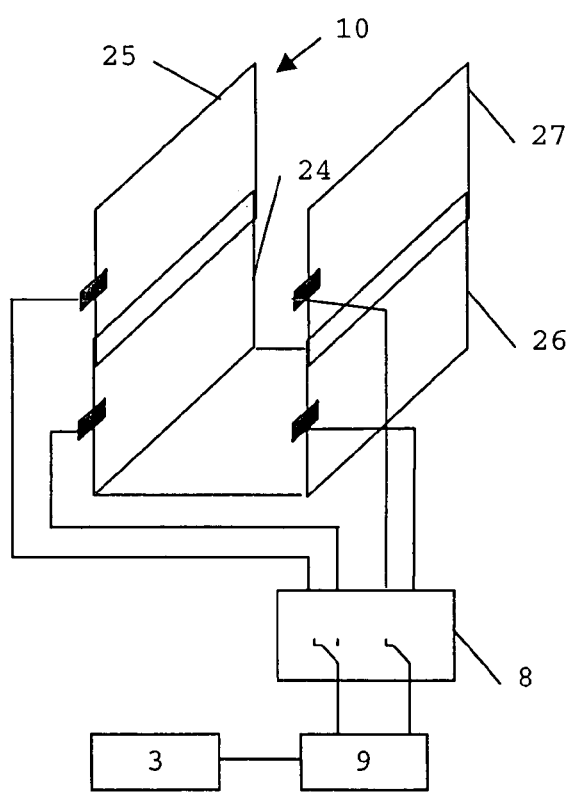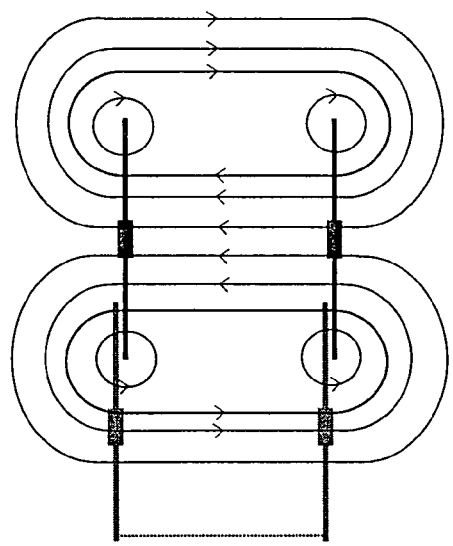
Fig. 17a                    Fig. 17b

ANTENNA ARRAY

CROSS REFERENCE TO RELATED APPLICATIONS

This application claims priority under 35 U.S.C. §119 the benefit of German patent application Ser. No. 10 2004 035 621.1, filed Jul. 22, 2004 and European patent application Ser. No. 04/028778.1, filed Dec. 4, 2004, which are incorporated herein by reference.

BACKGROUND OF THE INVENTION

1. Field of the Invention

The invention relates to an antenna array that is part of a radio frequency Identification (RFID) system for wireless or contact-free data transmission, particularly for reading from and writing to wireless contact-free data carriers, such as transponders.

2. The Prior Art

According to the state of the art, an RFID system comprises an RFID antenna that consists of at least one antenna loop that represents an inductance and is formed from one or more windings, an adaptation circuit; a read/write station having an integrated transmission, a receiver, and control unit; and a connecting line between the read/write station and the RFID antenna.

The RFID antenna of an RFID system has the following tasks: On the one hand, the transmission of power to the transponder, and on the other hand, the transmission of data to and from the transponder. The power and data transmission is based on the magnetic coupling of the alternating fields of the reader and the transponder in the close vicinity of the antenna.

A requirement for an RFID reader antenna is the power transmission to the transponder. For this purpose, the reader antenna, in turn, is supplied with power via a transmitter. To optimally transmit the power from the end stage of the reader to the antenna, the reader end stage and the reader antenna must possess the same input and output resistance, respectively. An RFID reader antenna therefore requires a certain input impedance, so that the power is optimally transmitted to the antenna from the reader end stage.

Furthermore, the reader antenna must be tuned as well as possible to the operating frequency of the RFID system, to achieve a high current and therefore a high magnetic field intensity.

If the resonance frequency of the reader antenna is tuned to the operating frequency of the RFID system, there is a high power transmission at a high quality for the reader antenna.

An adaptation circuit can adapt the input and output resistance, respectively, and balance the reader antenna with the operating frequency. This circuit is generally located in the direct vicinity of the antenna loop.

According to the state of the art, transponders consist of an integrated microelectronic component (IC) a resonance capacitor and an antenna coil, whereby the resonance capacitor is frequently already integrated into the microelectronic component. The antenna coil and the resonance capacitor form an electrical oscillating circuit and are, for example, tuned to the operating frequency of 13.56 megahertz (MHz).

If a transponder gets into the detection region of the reader antenna, the transponder receives power for operating the integrated circuit (IC), via the magnetic coupling with the antenna. The amount of the power is dependent on the field intensity, for example, on the number of field lines that penetrate the transponder, and the angle of the field lines to the transponder. The transponder receives the maximal power in the case of an angle of 90 degrees between field lines and transponder. If the angle between field lines and transponder is very acute or actually 0 degrees, the transponder is not penetrated by any field lines and therefore also does not receive any power.

If the power is sufficient, the microelectronic component is set into its base state and begins to work.

The range in which the transponder has sufficient power and can communicate with the RFID system is called the detection region.

The size of the detection region is determined by the following factors: antenna area, antenna shape, and current in the antenna loop (antenna current). The current, in turn, is dependent on the quality of the oscillation circuit, the output power of the RFID reader, and the inductance of the antenna loop, and reaches its maximum when the antenna is tuned to the resonance frequency.

To achieve the largest possible detection region, the largest possible antenna area would consequently have to be operated at the greatest possible antenna current. In practice, however, this is limited by various restrictions.

On the one hand, the output power of the end-stage amplifier of the RFID reader is limited, to keep the effort and expense as low as possible. Because of the antenna or of the adaptation circuit that can be heated during use, as well as experience the high voltages at the components in the resonance circuit, these effects also make the design and the development of cost-advantageous solutions for high transmission power more difficult.

The dependence of the magnetic field intensity on the current and the size of the antenna can be represented, fundamentally, using the following formula for a round antenna:

$$H(x) = \frac{I \cdot N \cdot r^2}{2(r^2 + x^2)^{3/2}}$$

Wherein:
H: magnetic field intensity
x: distance between the plane of the antenna and the transponder
I: current through the antenna
N: number of windings of the antenna
r: radius of the round antenna If the distance x between transponder and antenna loop is chosen to be equal to zero (transponder lies in the same plane as the antenna loop), the formula can be simplified as follows:

$$H(x) = \frac{I \cdot N}{2r}$$

The formula shows that the field intensity in the antenna center decreases at 1/r. If one assumes that the RFID reader is able to drive only a certain maximal current into an antenna array, it becomes clear that starting from a certain size of the antenna, the magnetic field intensity in the center of the antenna is no longer sufficient to operate a transponder.

On the other hand, the inductance becomes greater and greater for large antennas, as a function of the conductor length, for example, the area surrounded by the conductor. With higher frequencies (for example at 13.56 MHz), there are very small capacitances. Thus, according to the following equation, with these small capacitances it would be necessary to balance the antenna with the required resonance frequency.

The calculation of the resonance frequency can occur using the following formula:

$$f_{res} = \frac{1}{2\pi\sqrt{L \cdot C}}$$

f: frequency
L: inductance
C: capacitance.

These small capacitances in the resonance circuit make the antennas difficult to balance, and the sensitivity to changes in the ambient conditions becomes greater.

Large antennas and high transmission power furthermore lead to a disadvantage of exceeding the valid limit values of the national radio interference regulations.

Also, it is not possible to determine the position of the transponder within the large antenna area.

Another problem of a large antenna area occurs if the RFID reader is supposed to be able to communicate with a transponder even if a large number of transponders are located in the detection region of the reader antenna at the same time. In this case, the RFID power is divided up over the large antenna area, causing the local field intensity at each point in the detection region to drop. In this case, the resonance frequency of the transponders can change because of the reciprocal coupling with one another. This can occur particularly if the transponders are spaced apart at short distances from one another, thereby causing the field intensities that the transponder requires for operation to increase.

Furthermore, simple large antennas having a large area have the disadvantage that the transponders can only be read in one orientation, since the field lines exit from the antenna area perpendicular to it, and must also penetrate the transponder as perpendicular as possible, so that the necessary power is transmitted to the transponder.

A solution for the disadvantages discussed is described in a prior art reference WO 03/026067 A1, which was published as U.S. Pat. No. 2003/0052783 to Sizman on Mar. 20, 2003, the disclosure of which is hereby incorporated herein by reference. The desired detection region of an antenna is built up by way of the sum of the detection regions of several small antenna loops. Here, the individual antenna loops are brought together, in pairs, with an adaptation circuit, and additional antennas are connected with the RFID reader via power splitters or power dividers.

Disadvantages of the solution described are that the balancing of the antennas to the resonance frequency is very difficult, since the antennas, which are at small distances from one another, can reciprocally influence one another as a function of their distance from one another. Furthermore, gaps in the detection field occur between the antennas, or the range of the detection region is significantly lower at these locations. Thus, a continuous detection region exists only in the vicinity of an antenna, since the detection regions of the adjacent antennas only overlap slightly.

Another solution is proposed in another set of prior art references (DE 201 10 926 U1 and DE 299 21 752 U1). There, an active antenna connected with the reader is supplemented with one or more passive antennas. Here, the adaptation circuit of a passive antenna generally consists mainly of a capacitor that tunes the antenna to the resonance frequency. The antenna has no electrical connection with the reader and receives its power, just like the transponders do, only by way of the magnetic coupling with the active antenna.

With this solution, again, gaps occur in the detection region of the structure, due to superimposition of the magnetic field lines. This is because the field lines have different directions and phase positions relative to one another. As a result, the transponder has few field lines flowing through it if it is oriented parallel to the antenna, and therefore does not receive sufficient power.

Furthermore, the signal strength of the response telegrams from the transponders is reduced by the coupling factor between the active and the passive antenna, if a transponder is located outside of the detection region of the active antenna but in the vicinity of the passive antenna. This can have the result that although the transponder has sufficient power, it cannot be read.

If the antennas are overlapped, as described in a prior art reference (EP 1 298 573 A2), electromagnetic coupling occurs between the individual antenna loops, thereby changing the resonance frequency of the antennas and causing the transmission output of the reader to be distributed over all the coupled antennas, thereby resulting in a general reduction or a detection region having gaps.

Antennas with a small distance from one another or overlapping antennas have the property of being strongly coupled into one another. This has the result that balancing of the antennas is difficult and complicated, since they reciprocally influence one another.

When the antenna is put into operation, part of the transmission power goes into the adjacent antennas, because of the coupling. This power is lost to the transmission antenna, and this results in reduced field intensity values and reading ranges.

If the phase position of the currents of two antennas is the same-phase in the overlap region, holes occur in the detection region, in the region of the overlap, since the field lines are counter-current there.

Nevertheless, the division of a large antenna area into smaller individual antennas is already described in a prior art reference (WO 03/026067 A1 and EP 1 298 573 A2), whereby fundamental advantages of overlapping antennas are also already mentioned in EP 1 298 573 A2. Other Patents are known, for example, EP 01 86 483; U.S. Pat. No. 6,703,935 to Chung (the disclosure of which is hereby incorporated herein by reference); WO 03/090310 to Yang; and EP 06 54 840.

The technical problem underlying the invention is to create an antenna array for large, cohesive detection spaces, which avoid the disadvantages mentioned above.

SUMMARY

The present invention relates to an antenna array for RFID antennas for large cohesive detection spaces, having an operating frequency between 100 kHz to 30 MHz, which is connected with at least one read/write station. There can also be at least one antenna comprising or consisting of an antenna loop having at least one winding. The antenna array can include at least two antennas that are disposed in a plane, wherein the antenna loops of the individual antennas overlap. There can also be at least one multiplexer which is disposed between the read/write station and the antennas of the antenna array, for selected activation of the antennas. Because of this antenna array, the disadvantages discussed above do not occur. Furthermore, the invention results in the possibility of being able to read transponders in several orientations.

The invention can rely on different embodiments to cover large detection spaces via several overlapping antennas and eliminate the disadvantages of the reciprocal influence of the overlapping antennas and the difficult antenna balancing of the individual antennas.

In one embodiment, the degree and the position of the overlap of the antenna loops can be adjusted so that the electromagnetic coupling between the antenna loops assumes a minimal value, so that reciprocal influence of the antenna loops on one another no longer occurs.

In another embodiment, each antenna loop has with it a device for opening the antenna loop, which makes it possible to open an antenna loop when it is switched to be inactive, so that no electromagnetic influence on adjacent active antenna loops proceeds from the antenna loop that has been shut off.

In one embodiment, only one antenna of an antenna loop is activated at the same time, in each instance.

In another embodiment, the antenna array can be built up from at least three antennas, and wherein these antennas are connected with the reader by way of at least one additional power splitter, so that at least two antennas are activated at the same time.

In this case, the current in adjacent antennas can have the same current direction.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 2b shows a top view of the exemplary embodiment according to FIG. 2a;

FIG. 13a shows a top view of two overlapping antennas having a pentagonal shape;

FIG. 13b shows a gate array of two antennas having a pentagonal shape, which lie opposite one another and overlap one another, in each instance;

FIG. 17a shows a gate array of two antenna pairs that lie opposite one another and overlap one another, with multiplexer and power splitter;

FIG. 17b shows a representation of the field line progression of the gate shown in FIG. 17a;

DETAILED DESCRIPTION

Figure 1A:
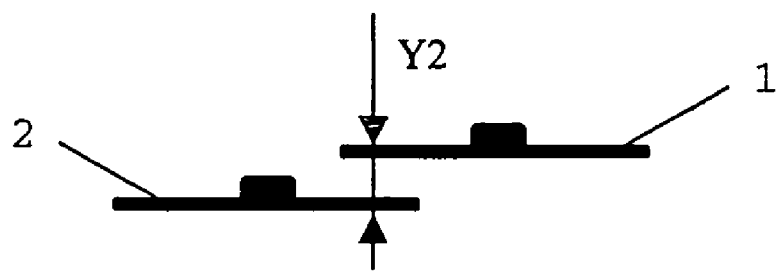
FIG. 1a shows a side view of two overlapping antennas.
Figure 1B:
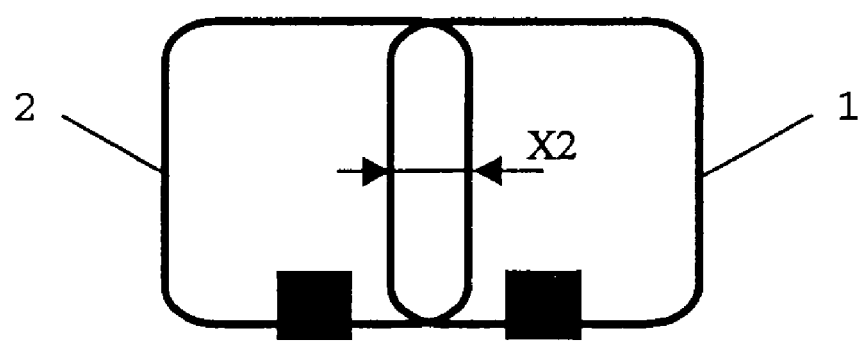
FIG. 1b shows two overlapping antennas in a top view.

FIGS. 1a and 1b show a first embodiment. In this first embodiment, two antenna loops 1, 2 overlap each other at a certain distance (X2, Y2) from one another, so that the two antennas 1, 2 lie in a spatial plane relative to one another, with a slight height offset. With this design, there is at least one certain position (X2) at which the reciprocal influence of the two antennas is no longer measurable, since they no longer couple into one another.

The antennas 1, 2 do not couple into one another if the sum of the field lines of the first antenna 1 that enter into the second antenna 2 is equal to the sum of the field lines of the first antenna that exit from the second antenna 2, and vice versa.

A precise mathematical calculation of the precise position of the antennas 1, 2 relative to one another is possible using vectorial addition of the electromagnetic fields, but in most cases, a practical determination is more simple.

The position at which the coupling of the two antennas 1, 2 practically cancels itself out can be determined via measurement technology, using two independent methods.

Figure 2A:
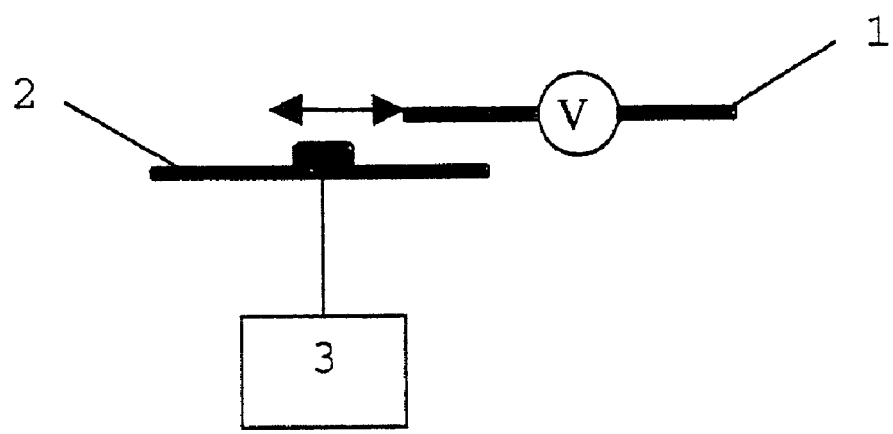
FIG. 2a shows a side view of two overlapping antennas, whereby a voltmeter is connected with one of the antennas.
Figure 2B:
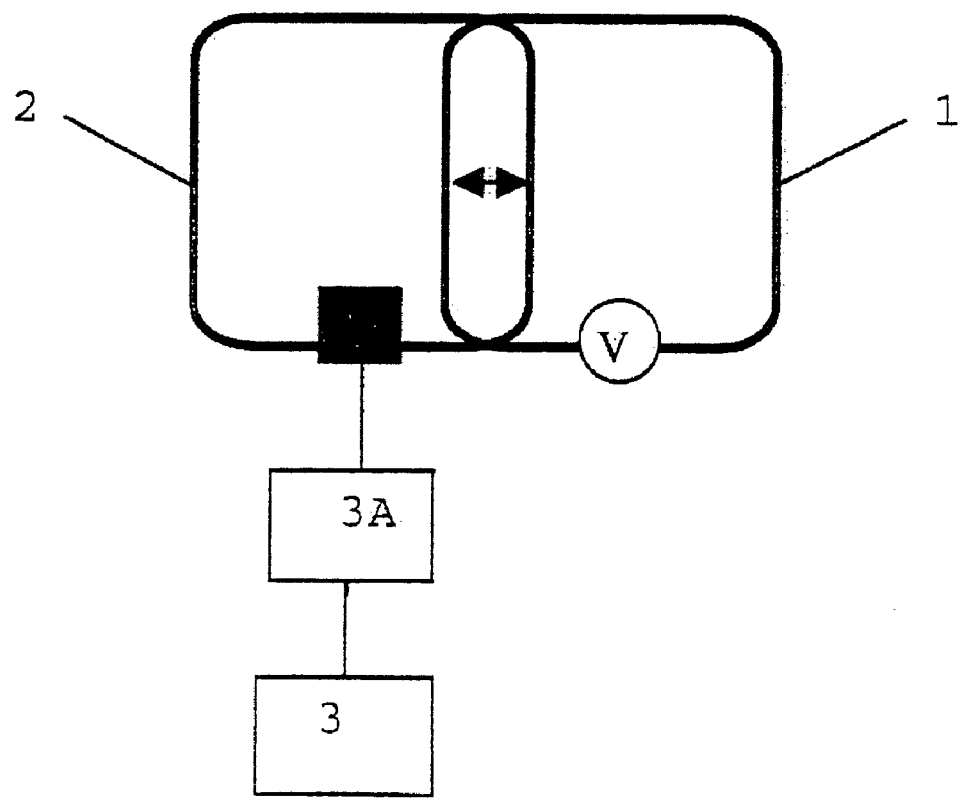

With the first method, shown in FIGS. 2a and 2b, the open ends of second antenna loop 2 are connected with a voltmeter (V), while first antenna 1 is connected with a reader 3 and supplied with RF power by the latter. Afterwards, antenna loop 2 is very slowly pushed over first antenna 1. The position at which the induced voltage in second antenna loop 2 approaches zero is the position being sought.

With the second method, the two antennas 1, and 2 must first be brought into a position in which they do not influence one another, and tuned to their working point (resonance frequency) in this position.

Afterwards, the two antennas 1, and 2 must be pushed one over the other, very slowly, whereby again, only one of the two antennas 1, or 2 is actively supplied with RF power by reader 3. As they are being pushed one over the other, the input impedance of antennas 1, and 2 is observed. The position being sought has been reached once the input impedance corresponds to the antenna that was previously uninfluenced. Measurement of the input impedance can alternatively occur via a standing wave ratio measurement device (SWR-meter) 3a, wherein the ratio between the transmitted and reflected power is measured. As soon as the standing wave ratio assumes its minimum, the overlapping position being sought has also been found.

If antennas 1, and 2 were to be displaced further, the reciprocal influence would increase once again and reach its maximum when the two antennas 1, and 2 overlap completely.

The overlap width (X2) can be influenced slightly via the perpendicular distance (Y2) between the two antennas, as shown in FIG. 1a. A perpendicular distance (Y2) of approximately 5 to 15 millimeters has proven itself to be advantageous with rectangular antennas having a size of approximately 800×600 millimeters.

Figure 3A:
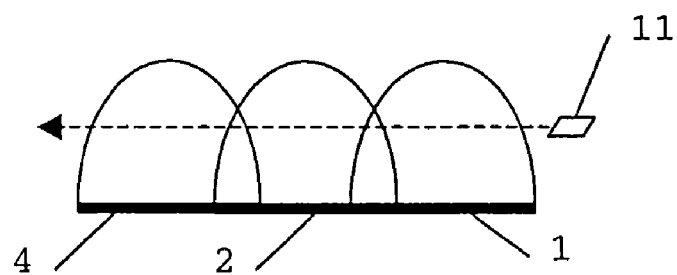
FIG. 3a shows side view of three overlapping antennas.
Figure 3B:
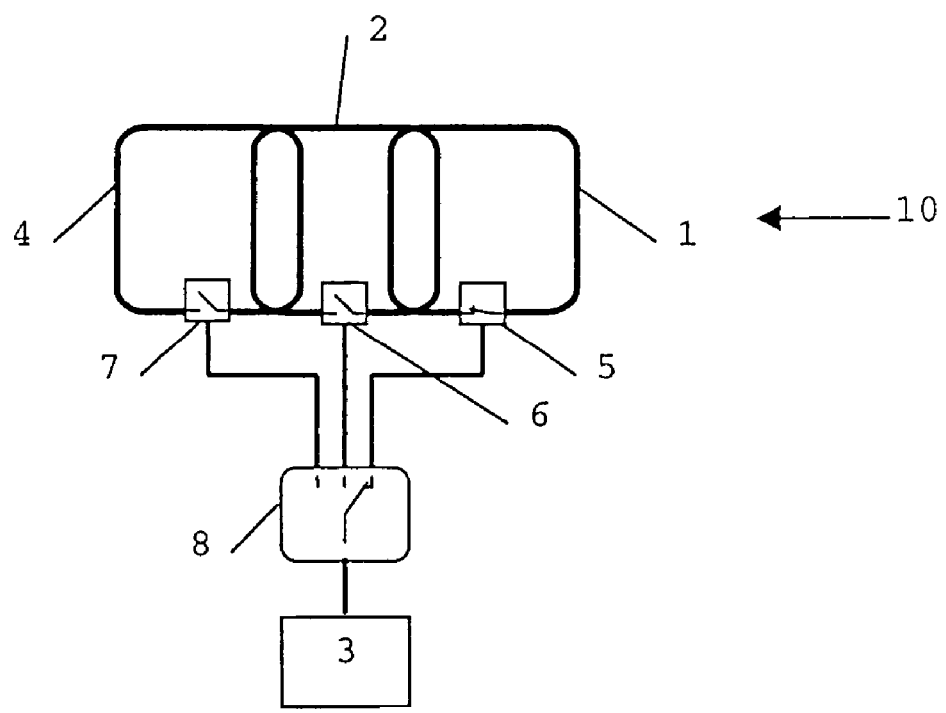
FIG. 3b shows a top view of three overlapping antennas, with a connection to a multiplexer.

FIG. 3a shows half the detection region of an antenna array shown in FIG. 3b.

In this embodiment, the overlap of the antennas 1, 2, 4 can be selected almost without restrictions. For this purpose, there is at least one switch 5, 6, or 7 which is disposed at every antenna loop 1, 2, or 4, wherein the antenna loop 1, 2, or 4 itself can be opened, so that it no longer contains any inductance. For example, the loop no longer represents an oscillation circuit together with the oscillation circuit capacitors of the adaptation circuit, wherein this antenna loop overlapping the antenna loop could couple into the oscillation circuit electromagnetically. Only at the time point when the antenna is connected with the reader, must the antenna loop be closed by way of a switch so that it is ready for operation.

With the opening the antenna loop, any overlap that can be imagined is possible, since the split-up antennas 1, 2, and 4 can no longer couple into the other antenna. Therefore, the detection region can be built up of individual antennas, in accordance with the application.

With the dividing of the large antenna area up into overlapping smaller antenna areas, the following results are achieved:

1. The antenna arrays having a variable antenna area can be built up from standard antennas, and therefore the number of variants of the required antenna sizes becomes less;
2. The local magnetic field intensity in the useful region of the antenna increases on the basis of the smaller antenna area, thereby guaranteeing reliable operation even if a plurality of transponders is located in the detection region of the antenna array;
3. The maximal range of the antenna array can be more precisely predicted, because it results from the maximal range of an individual antenna of the antenna array;
4. A continuous detection region is formed over the antenna array;
5. The remote field emitted by the antenna becomes less which, while no longer sufficient for operating a transponder, is not allowed to exceed a certain limit for national radio interference regulations; and
6. The position of the transponder within the detection region can be determined more precisely.

As shown in FIGS. 3b, 4b, 5b, and 6, connection of the antenna array with overlapping individual antennas to the RFID reader can occur in different ways. Thus, for example, either multiplexers 8, or power splitters 9, or combinations of multiplexers 8 and power splitters 9 are switched between antenna array 10 and RFID reader 3, thereby resulting in a plurality of different embodiments of the antenna array.

Figure 4A:
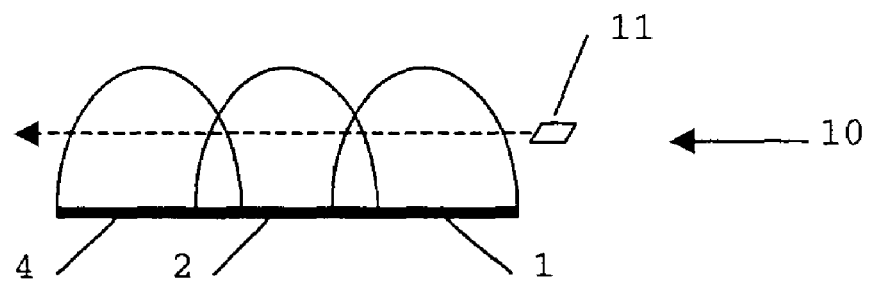
FIG. 4a shows a top view of three overlapping antennas.
Figure 4B:
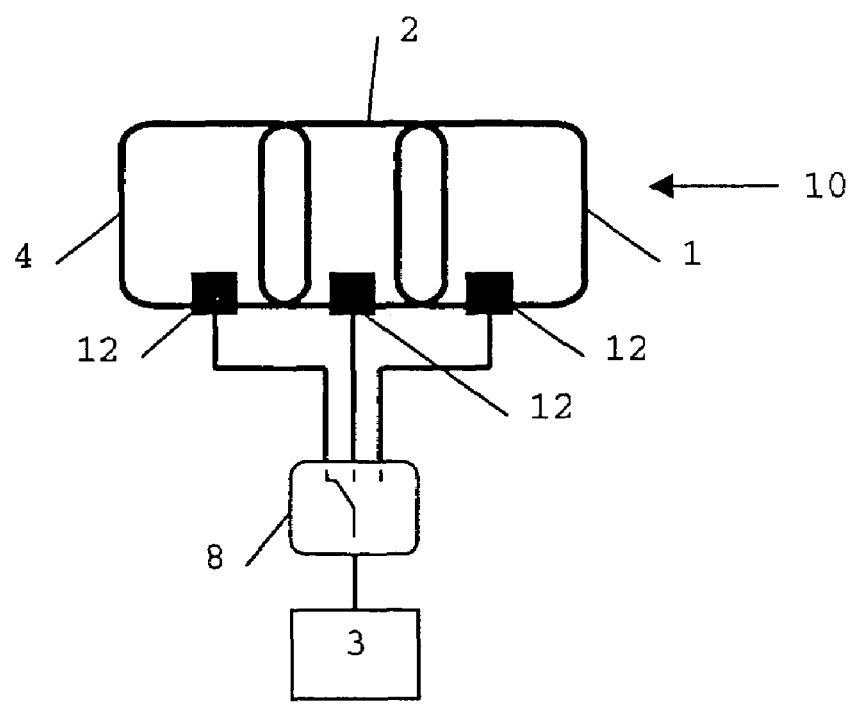
FIG. 4b shows a top view of three overlapping antennas, with an adaptation circuit and a multiplexer.

FIGS. 3b and 4b show an array having a multiplexer 8. In FIG. 4b, the antennas 1, 2, 4 have adaptation circuits 12. In FIG. 3b, there are switches 5, 6, 7. In the two embodiments described above, connection of antenna array 10 of overlapping antennas 1, 2, 4, to an RFID reader 3 occurs via a multiplexer 8 that is disposed between the RFID reader 3 and the antenna array 10 of overlapping antennas 1, 2, 4. This design makes it possible that only the antennas 1, 2, 4 with the RFID reader 3 are switched on at a particular point to communicate with a transponder 11.

If the antennas 1, 2, 4 are connected with the reader 3 via the multiplexer 8, only one antenna is connected with the reader 3, at a specific time.

The individual antennas can be combined to create a large antenna array. These individual antennas can be connected with multiplexer 8. With this design, the power of RFID reader 3 is concentrated on a smaller area of an antenna, and a high magnetic field intensity is generated in the detection region of the individual antenna. This design thus, satisfies the radio interference regulations.

Because of the high field intensity values in the detection region of the smaller antenna, even several transponders that are at a small spatial distance from one another or small transponders having low sensitivity can be reliably read.

Because of multiplexer 8, only one reader 3 is needed for all of the antennas 1, 2, and 4, and this further reduces the effort and expense. If multiplexer 8 is controlled by reader 3, the position of the transponder in the detection region can be determined, since the antennas 1, 2, and 4 currently connected with reader 3 are known.

Figure 5A:
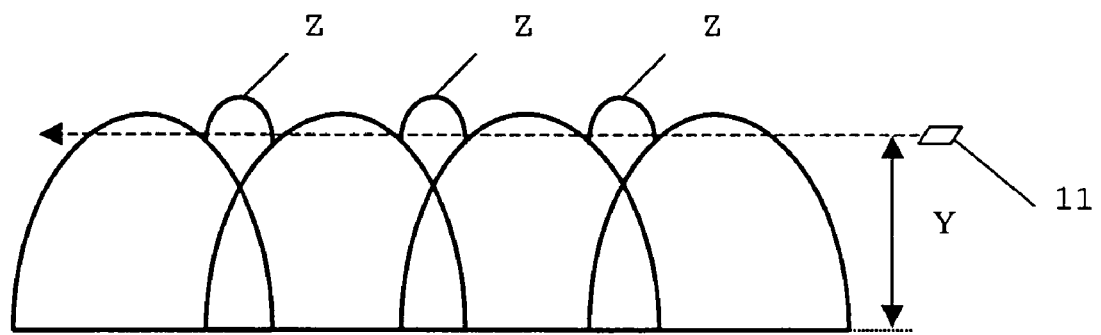
FIG. 5a shows a cross-sectional view of the detection region of four overlapping antennas.
Figure 5B:
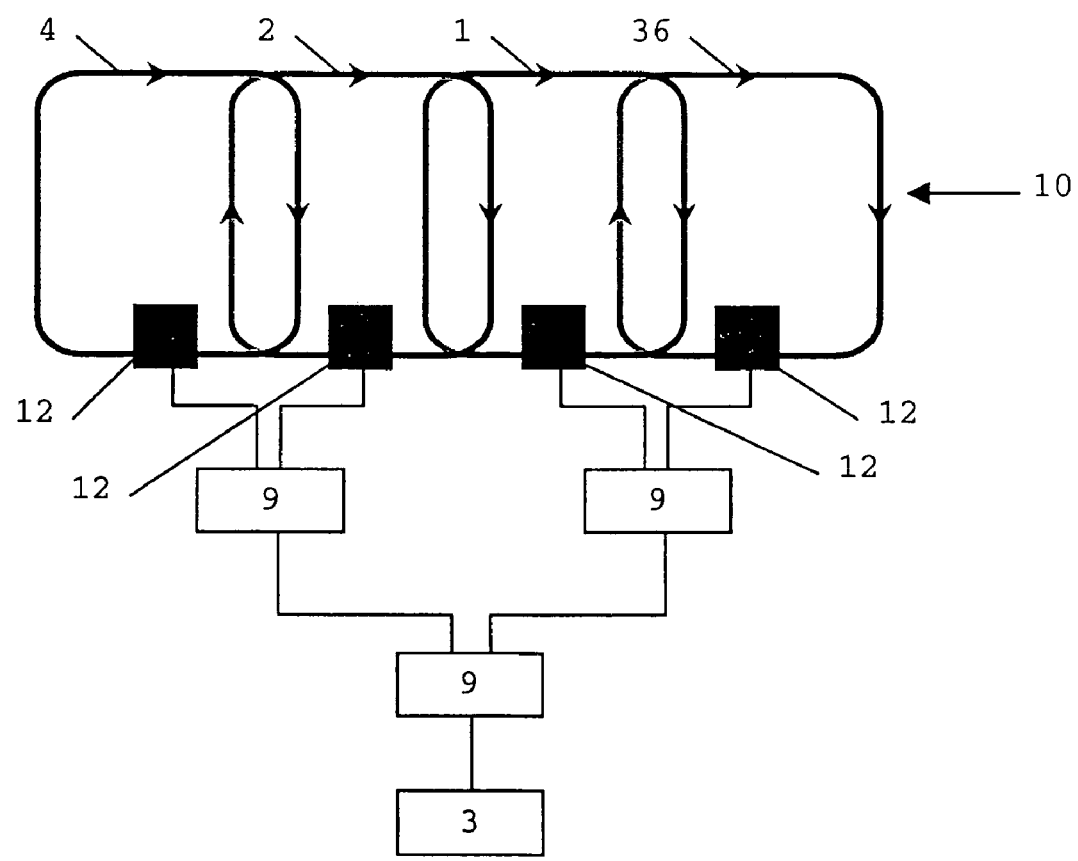
FIG. 5b shows a top view of four overlapping antennas with an adaptation circuit and a power splitter.

In the embodiment shown in FIG. 5b, the four overlapping antennas 1, 2, 4, and 36 are connected via power splitters 9 that are placed between RFID reader 3 and antenna array 10. Power splitters 9 make it possible to activate two or more antennas 1, 2, 4, and 36 within antenna array 10 at the same time. Thus, power splitters 9 are disposed between RFID reader 3 and antennas 1, 2, 4, and 36 that are supposed to be active at the same time, and distribute the power to antennas 1, 2, 4, and 36 that are active at the same time. At the same time, these power splitters make an impedance adjustment so that RFID reader 3 continues to be loaded with the antenna impedance that is specified for it.

The advantages of this array, result in a large antenna area, which is formed from smaller individual antennas switched together by way of power splitter 9. This effect results in the reduction in the remote field of antenna array 10 and the ability to more precisely determine the maximal range of the antenna array, thereby reducing an unintentional influence of a separate, adjacent antenna array that might be present.

In FIG. 5A, the detection region of antenna array 10 as shown in FIG. 5B is represented, as is a transponder 11 that is being guided through the detection region.

If, in addition, the current direction in the antenna loops is selected so that the current in the antenna loops has the same direction, this makes the current counter-phase in the overlap region. This design results in a detection region in which the read distance (Y) is greater, over the entire antenna array 10, than would be the case if every antenna of antenna array 10 were activated separately. This is because the magnetic fields of the antennas in the overlap region add up, making it possible to communicate even with a transponder that is located in the region (Z) and at a distance (Y) between the two antennas.

Figure 6:
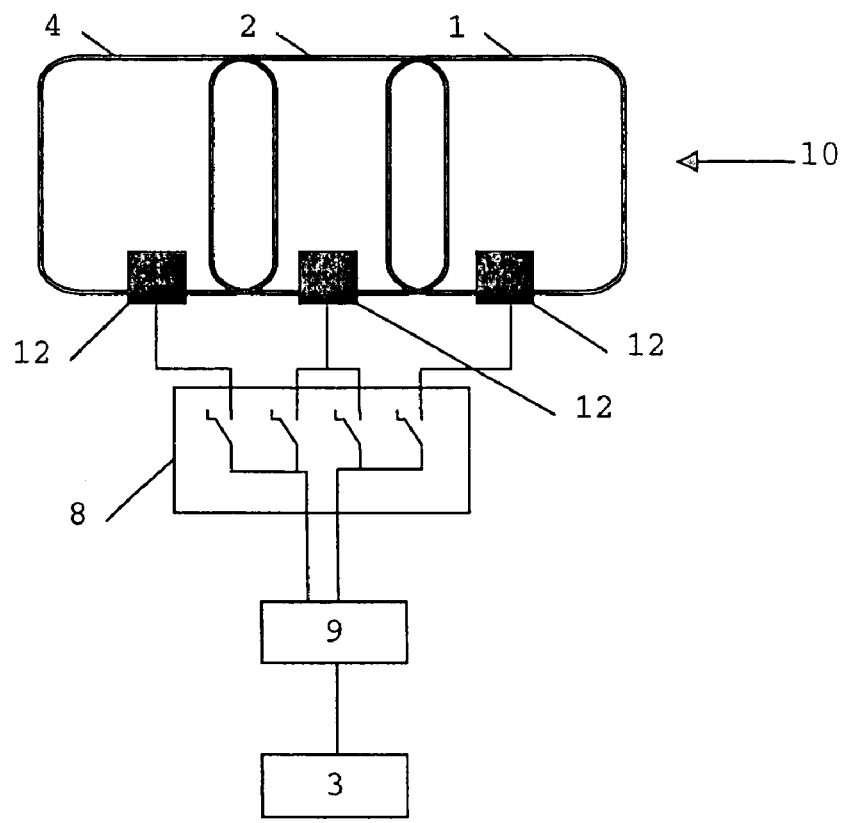
FIG. 6 shows a top view of three overlapping antennas with an adaptation circuit, multiplexer, and power splitter.

FIG. 6 shows another antenna array. This antenna array results from three antennas 1, 2, and 4, a multiplexer 8, and a power splitter 9. With this array, it is possible to operate at least two of these antennas 1, 2, and 4 at the same time, in each instance, by way of power splitter 9, thereby increasing the read speed of the system as a whole, as compared with a solution in which only multiplexers are used.

This makes it possible to activate the antennas in pairs, sequentially. For example, the sequence can occur in a first step, with antennas 4, and 2, and in a second step, with antenna 2, and 1, thereby forming a detection region that changes spatially and has no gaps. If the switching speed takes place analogous to the movement speed of the transponder, the time for communication with the transponder increases, and this is advantageous, for example, for data exchange of large amounts of data.

It is also possible to implement the antenna array shown in FIG. 6 with more than three antennas, more than one multiplexer, and more than one power splitter.

Figure 7:
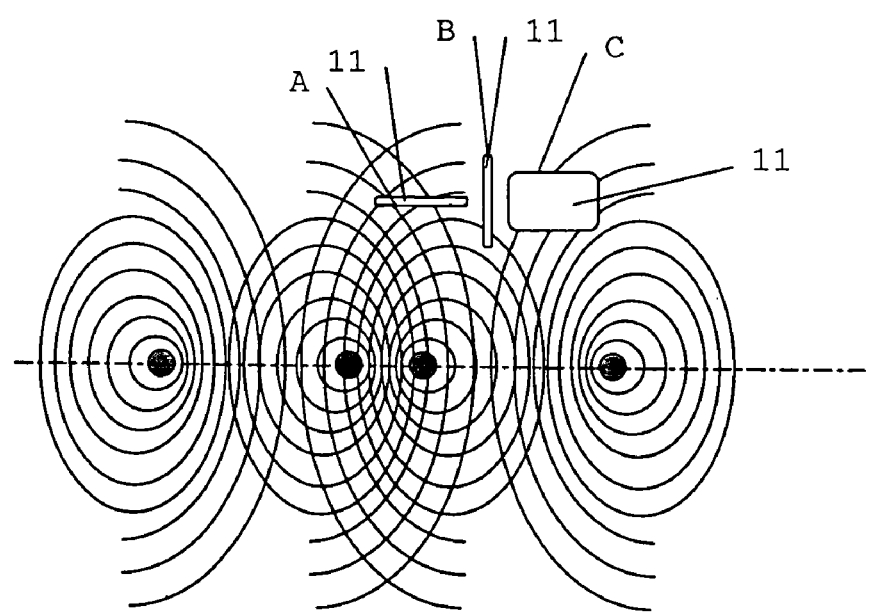
FIG. 7 shows a top view of a representation of field lines of two antennas, with the arrangement of three transponders in the field.

The antenna arrays described above are primarily designed so that a transponder 11 is oriented in an orientation that is as plane-parallel to the antenna area as possible, as shown in FIG. 7 in position (A). In FIG. 7, transponder 11, having the position designation (A), is disposed in an area-parallel orientation. In this case, transponder 11, having the position designation (B), is disposed in an orthogonal-parallel orientation, and transponder 11, having the position designation (C), is disposed in an orthogonal-perpendicular orientation, relative to the field lines. The more the orientation of transponder 11 shifts to the orthogonal-parallel orientation, as compared with the flat antenna array, the less the field lines penetrate the antenna of the transponder, and this has the result that the electromagnetic power coupled into the antenna of the transponder is no longer sufficient, starting from a certain position angle, to operate the transponder, i.e. the magnetic coupling between antenna array and transponder becomes too slight.

Only as transponder 11 enters into and exits from the detection region of the antenna array, can communication take place with a transponder 11 oriented in such an orthogonal manner, for a short distance.

Figure 8:
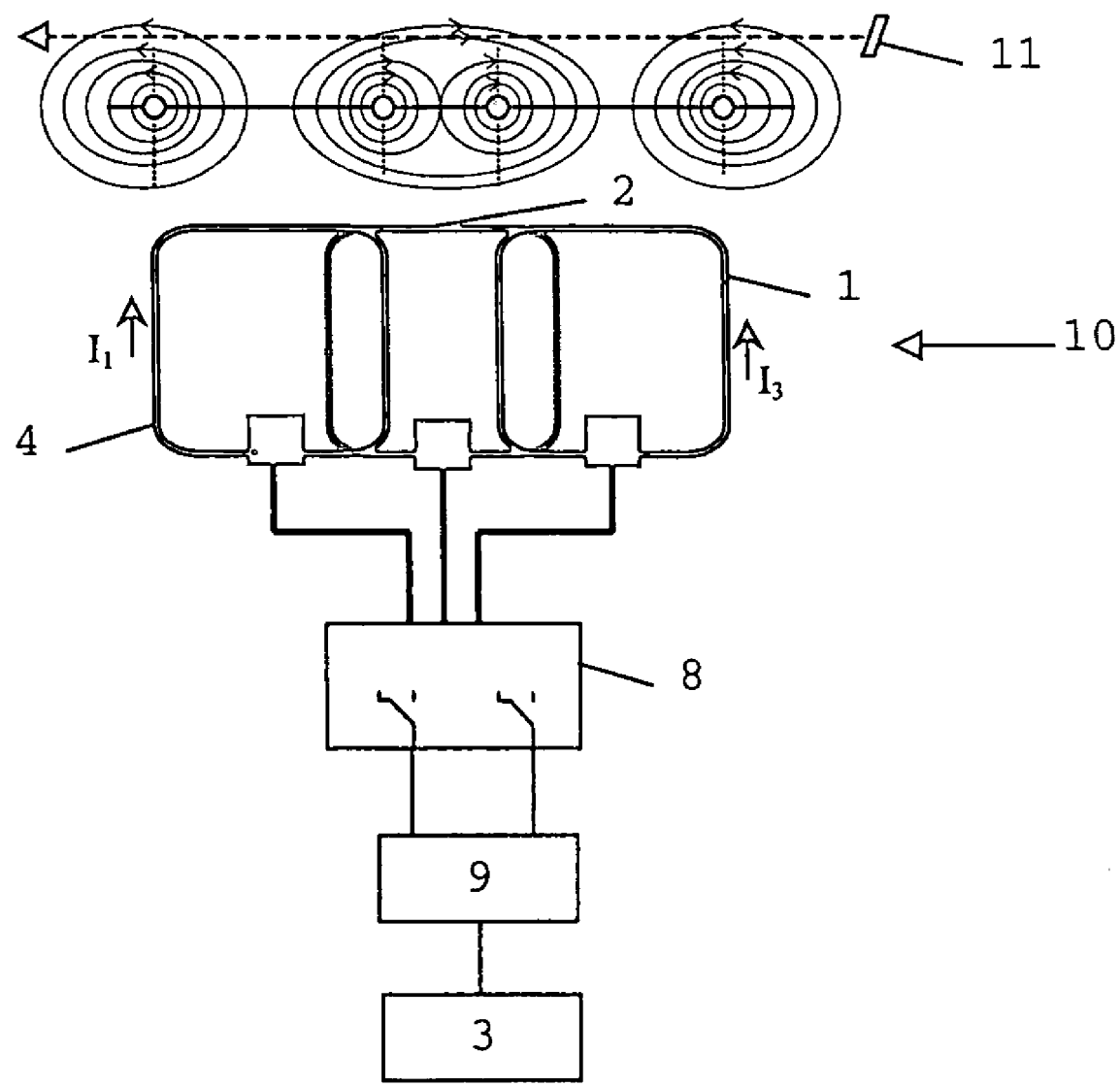
FIG. 8 shows another embodiment with three antennas, with current flowing in the opposite direction in the outer antennas.

To read even transponders 11 that are oriented orthogonally, and to ensure that large detection spaces are covered by the antenna array, there is another set of antennas 1, 2, and 4 of another embodiment, shown in FIG. 8. This set comprises three antennas 1, 2, and 4, a multiplexer 8, and a power splitter 9, which are switched so that a current I1, or I3 in the two outer antennas 1, and 4 flows in the opposite direction for a certain short period of time, while antenna 2 that lies in between is inactive for this period of time. This results in a magnetic field having an essentially horizontal orientation between the two outer antennas, as shown in the upper part of FIG. 8.

At another time point, antennas 1 and 4 of the antenna array are then switched to be of the same-phase, so that the field possesses an essentially vertical orientation, to communicate for a certain short period of time with transponders 11 that are located essentially area-parallel to the antenna array.

Figure 9A:
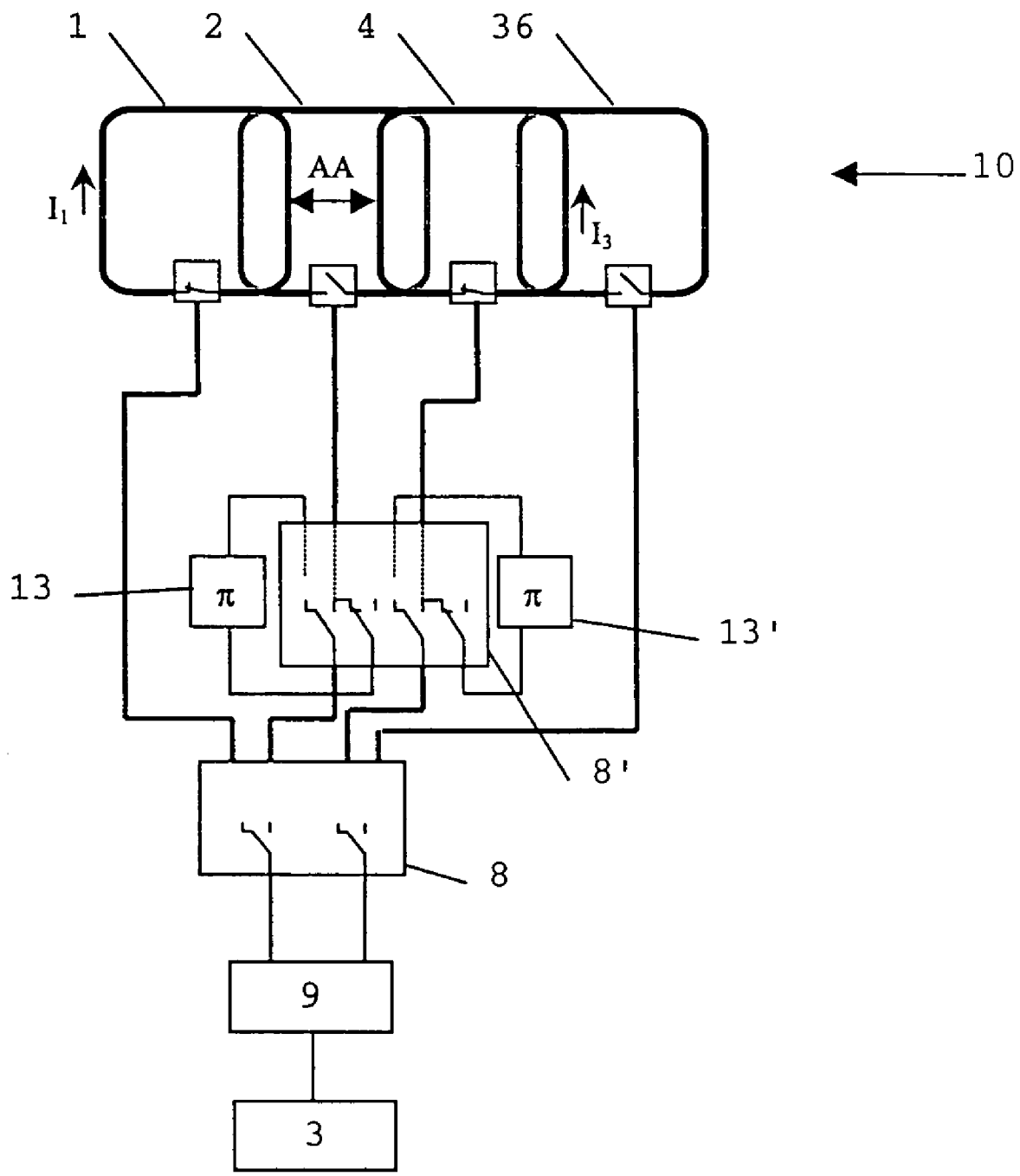
FIG. 9a shows a block diagram of a modified exemplary embodiment having four overlapping antennas, a power splitter, multiplexers, and two phase shifters.

FIG. 9a shows switching between the same-phase and counter-phase current direction in antennas 4, 2, 1, and 36 which occurs via multiplexers 8, and 8' and the 180 degree phase shifters 13, and 13'. This arrangement makes it possible to communicate both with transponders 11 that are oriented essentially area-parallel, and with transponders 11 that are oriented essentially orthogonal.

Figure 9B:
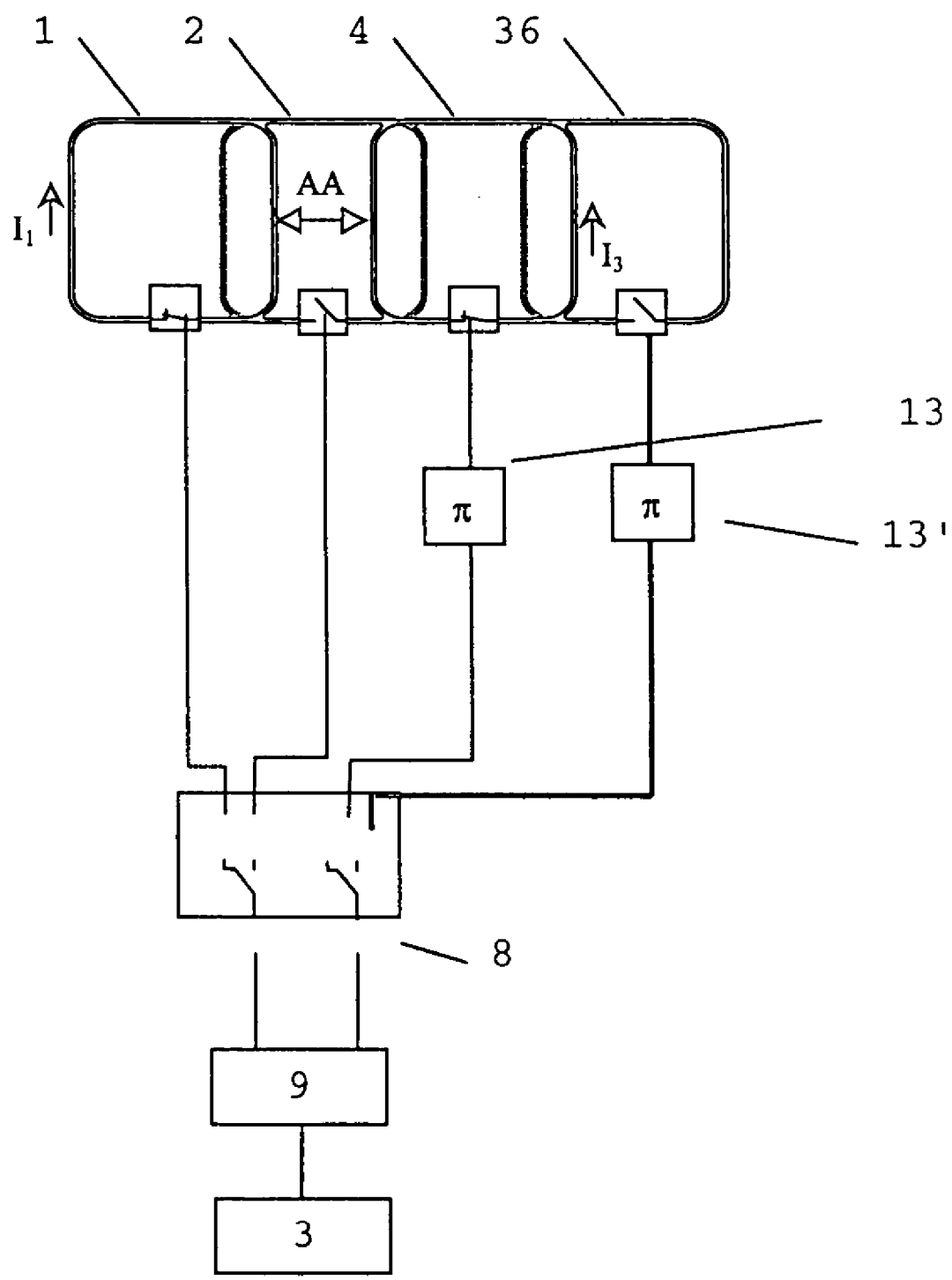
FIG. 9b shows a block diagram of a modified exemplary embodiment having four overlapping antennas, a power splitter, a multiplexer, and phase shifters.

FIG. 9b shows another embodiment wherein phase shifters 13, 13' shift the phase position of the alternating current in antennas 4, 36 by 90 degrees, in each instance, relative to the phase position of the current in antennas 1 and 2.

Figure 10A:
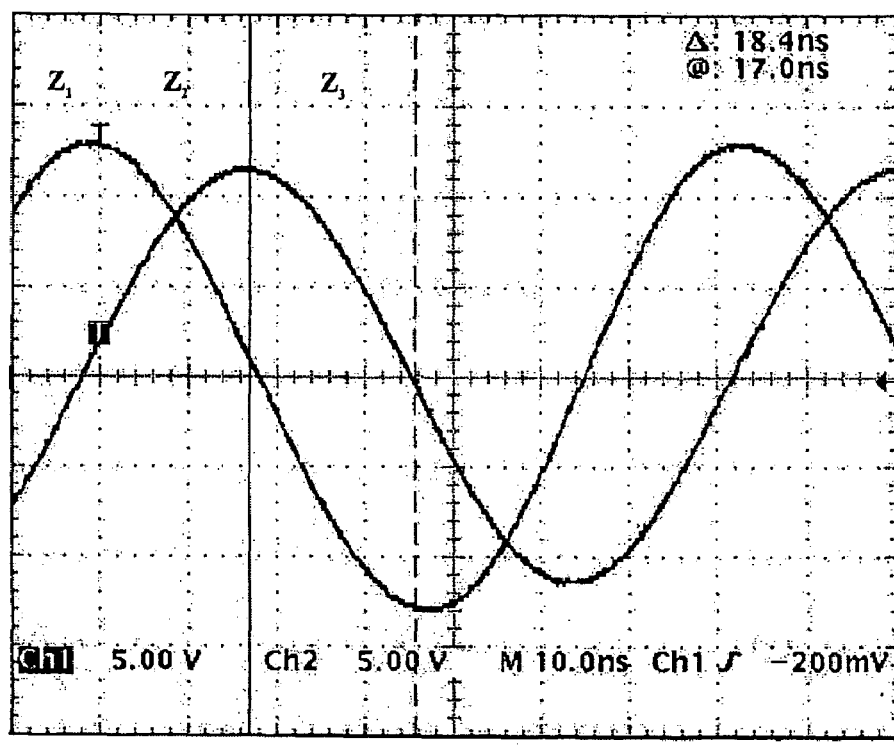
FIG. 10a shows a representation of a current progression of two antennas.
Figure 10B:
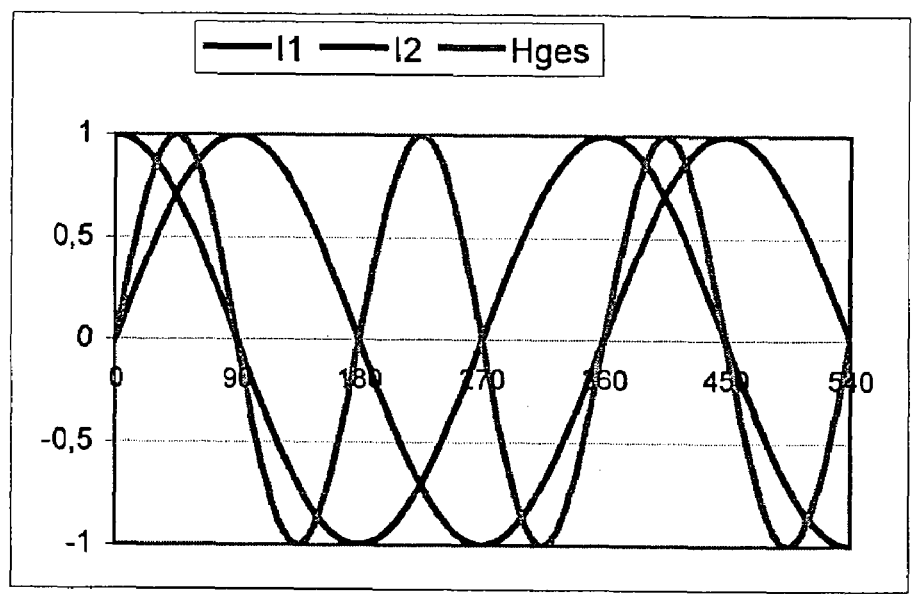
FIG. 10b shows a representation of a current progression of two antennas.

If one considers the current progressions in the two antennas over time, as shown in FIGS. 10a and 10b, it becomes evident that the currents at the time point $(Z_2)$ are same-phase and have the same positive amount, and are counter-phase (positive/negative) with a different amount at the time point $(Z_1$ and $Z_3)$. With the addition over time of the field lines from both antennas 1, and 2 caused by the current flow, there is now a field line progression that alternates with twice the transmission frequency between the field line progression of the structure having the same current direction and the opposite current direction.

Therefore, a resulting electromagnetic alternating field is formed that constantly alternates, at twice the transmission frequency, between the predominantly vertical and the predominantly horizontal orientation.

All of the structures described above can be implemented with practically any antenna shape. Also, antennas having different shapes can be overlapped and combined into antenna arrays.

Frequently, the shape of the antenna is also determined by the application, because it must fit into a certain design, for example, or mechanical default values are present.

To communicate even with those transponders 11 that are oriented essentially orthogonal-perpendicular, as shown in FIG. 7, position (C), the antenna loops can be formed as having at least one non-rectangular side, in each instance rather than as rectangles that have edges that are parallel.

Figure 11:
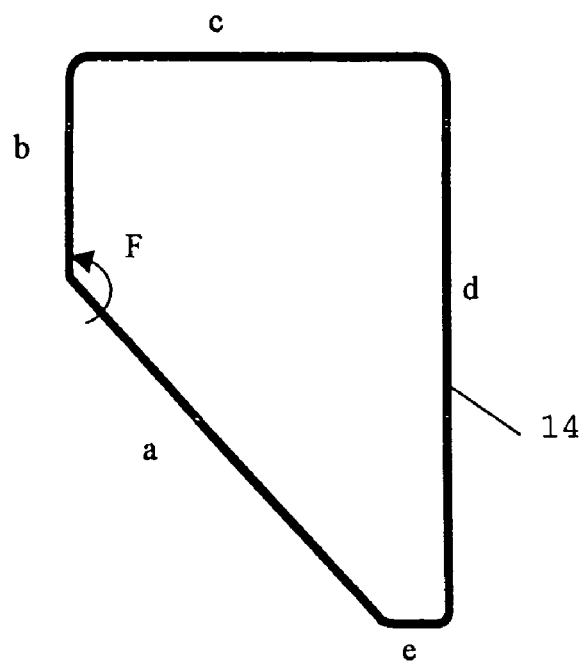
FIG. 11 shows a representation of a pentagonal shape of an antenna.
Figure 12:
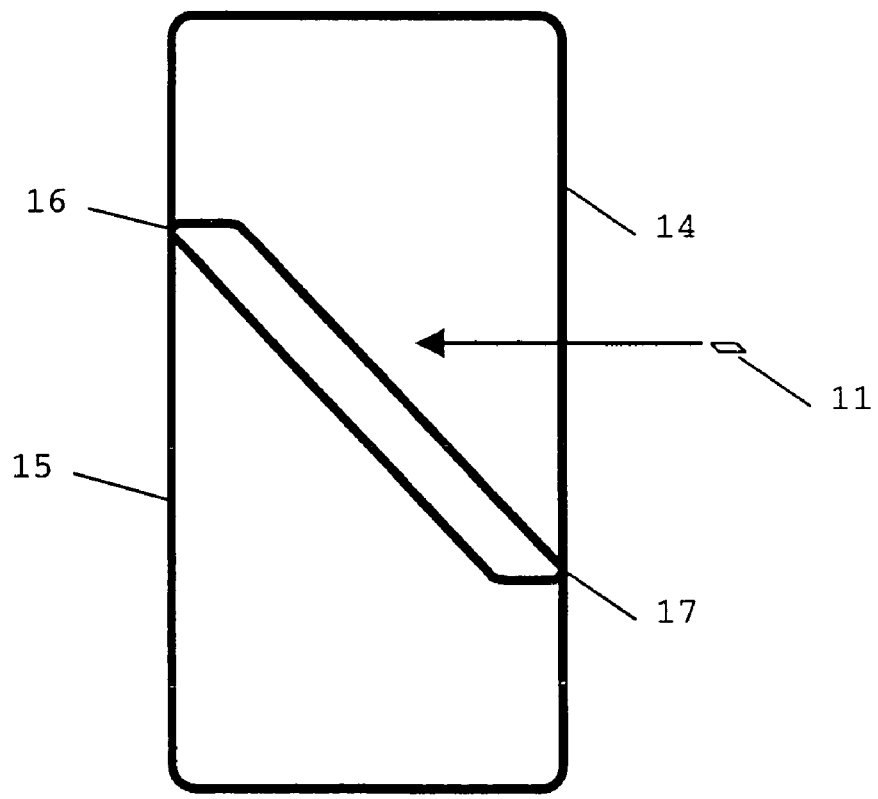
FIG. 12 shows a top view of two overlapping antennas having a pentagonal shape.

FIG. 11 shows an individual antenna having a pentagonal shape. FIG. 12 shows two overlapping antennas having a pentagonal shape. This antenna array of at least two antennas 14, and 15 having a pentagonal shape with non-equal side lengths can be useful.

With this shape, antenna loop 14, as shown in FIG. 11, is formed from the five sides a to e, whereby the sides b and d as well as the sides c and e are oriented to be parallel to one another, in each instance, but have a different length. No other side lies parallel to side a.

With this design, the lengths of sides a to e are selected so that a right angle of 90 degrees is formed between sides b and c, c and d, and d and e, while the angles between sides a and b and a and e form an obtuse angle that advantageously lies between 132 degrees and 138 degrees. This is so that the sum of the angles of the pentagon amounts to 540 degrees again. Acute angles would have the disadvantage that a particularly high magnetic field intensity would occur in the region of the acute angles, resulting in a non-homogeneous magnetic field of the antenna array, which would result in losses in the read range of the antenna array.

Another advantage of this shape of antenna loops 14 and 15 is that with an overlap of antenna loops 14 and 15, the sides of the one antenna loop 14 do not run directly parallel over a side of the other antenna loop 15 at any point. This is because the two antenna loops 14 and 15 merely have two intersection points 16 and 17 when they overlap, while the sides (a) of the two antenna loops 14, and 15 that are guided to be parallel already run at a certain distance from one another.

Because no conductive part pieces are guided to be directly parallel to one another at intersection points 16, and 17, the capacitative coupling of antenna loops 14, and 15 with one another is minimized. This capacitative coupling would otherwise result in a negative influence on the antenna array, if one of the antenna loops 14, and 15 were opened via a switch to prevent magnetic coupling of antenna loops 14 and 15 with one another.

FIG. 13a shows antennas 14 and 15, which partially overlap, with feed-in points 21.

FIG. 13b shows a gate array of the antennas 14, and 15; and also 14' and 15'. With this design, there is shown a closed read window with the opposite current direction due to the slanted progression of part of the antenna conductor, with two overlapping antennas 14, and 15; and 14', and 15' per gate side.

Figure 14:
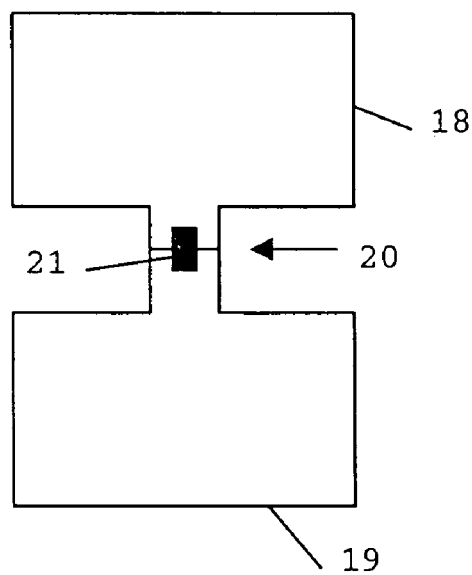
FIG. 14 shows a modified exemplary embodiment of an antenna loop, in a top view.

FIG. 14 shows another antenna loop 18, which represents a shape of the antenna loop similar to the symbol for the number "8".

With this design connection, antenna loop 18 is formed from an essentially rectangular base body 19 that has a symmetrical constriction 20 in its horizontal axis of symmetry. The feed-in point 21 of antenna 18, is the location at which the current is fed into antenna loop 18, and is located in the symmetrical center of constriction 20. With this structure, an 8-shaped antenna having two parallel antenna loop halves is formed.

This special shape and the location of feed-in point 21 has the advantages that because of the quasi parallel-switching of the two antenna loop halves, a low inductance of the antenna is obtained, since the following applies for inductances switched in parallel:

$$\frac{1}{L_{res}} = \frac{1}{L_1} + \frac{1}{L_2}$$

Furthermore, the interference sensitivity against interference coupled in from the outside is less, because the current in the two conductive loops runs in opposite directions. Thus, there is a large compensation for interference coupled into the two antenna loop halves from the outside.

Furthermore, the different current directions in the two conductive loops results in a reduced field intensity in the remote field. This result significantly facilitates a radio interference permit, because the magnetic field that exits in one antenna loop half enters again in the other antenna loop half. Thus, there is the formation of only a small scatter field that can be measured at a distance.

Figure 15:
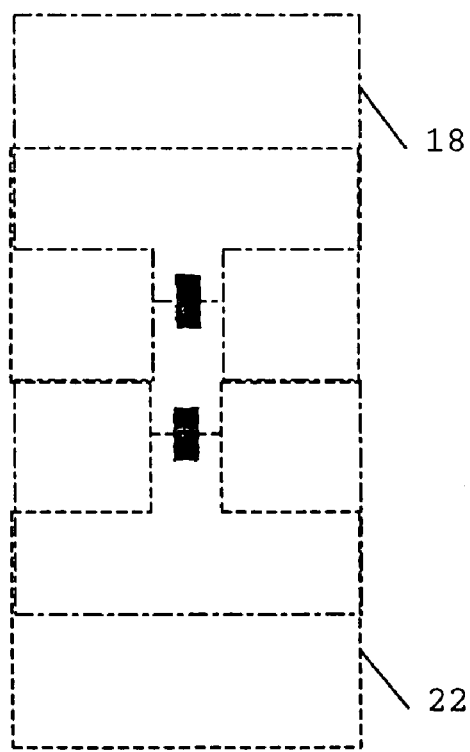
FIG. 15 shows a top view of two overlapping antennas according to the exemplary embodiment of FIG. 14.

Because of the overlap of antennas 18 and 22, as shown in FIG. 15, there is very slight coupling, and this allows a simple construction of the antenna.

Figure 16:
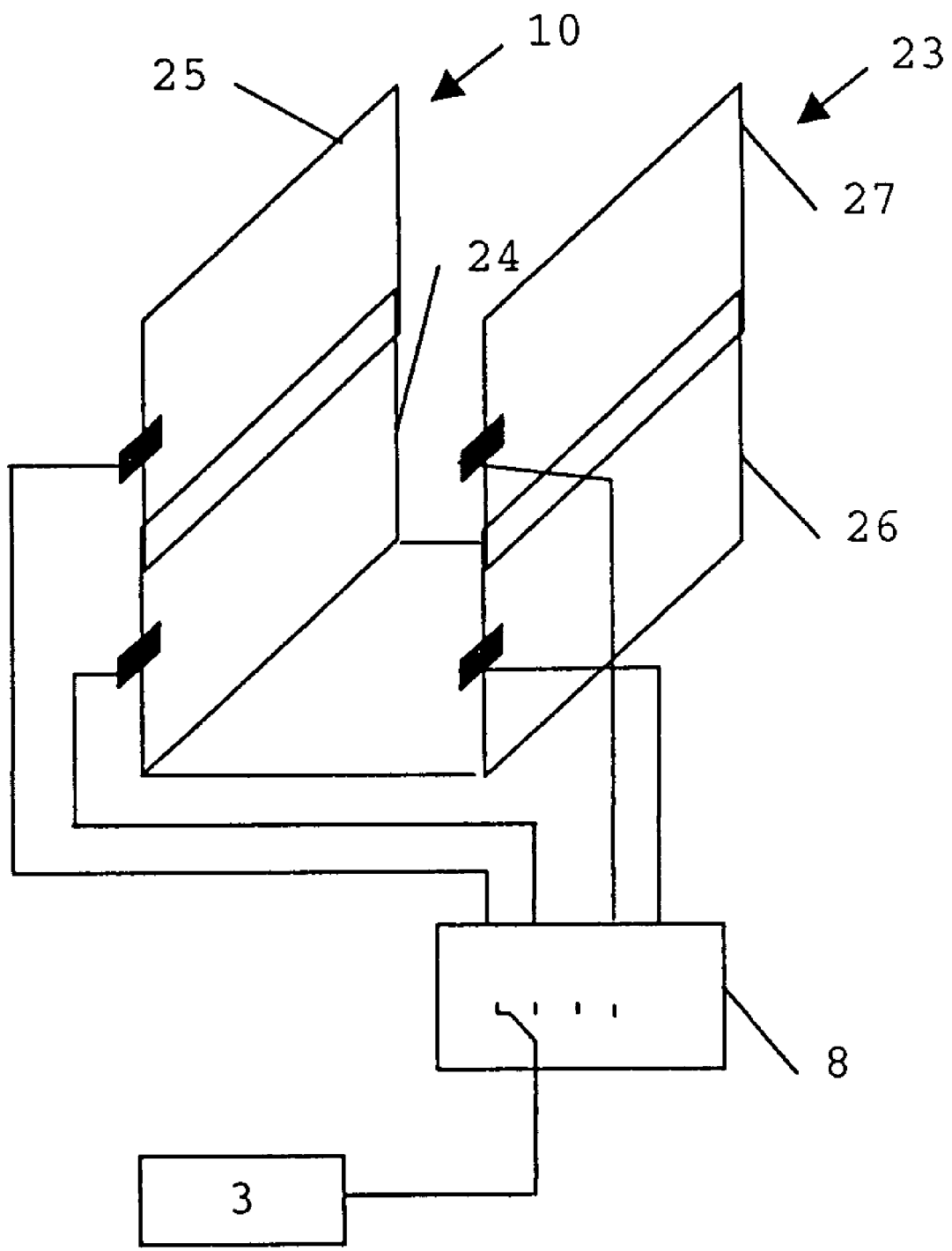
FIG. 16 shows a perspective view of a gate array of two antenna pairs that lie opposite one another, with multiplexer.

As shown in FIG. 16, two of the antenna arrays 10 and 23 can be disposed area-parallel to one another, so that two antennas 24 and 25 are disposed overlapping in a first plane, and two other antennas 26 and 27 are disposed overlapping in a second plane. Thus, the antenna arrays 10 and 23 of the first and second plane are disposed essentially area-parallel to one another, at a spatial distance from one another. In this way, they form an antenna array, generally referred to as a gate or passageway.

With a placement of the antenna array 10 and 23 as a gate, there are other advantages for being able to communicate with transponders in a large detection space.

For example, by using the gate antenna array 23, it ensures that when a transponder is moved through between the two planes of the antenna array, in linear manner, communication with the transponder can occur, independent of the location and the orientation of the transponder.

In addition, the distance between the two antenna fields 23, also called gate width, can have twice the read range/detection region of an array having one plane.

FIG. 17a shows that a multiplexer 8 and a power splitter 9, can also be included.

The complete space between the two antenna fields can be scanned by sequentially switching on the antennas 24, 25, 26, and 27 by way of multiplexer 8.

As shown in FIG. 17b, there can be constructed particularly wide gates or arrays having high field intensity values by using antennas 24, 25, 26, and 27, which can be switched so that the two opposite antennas 24, and 26; and 25, and 27 are switched on, in each instance, and the currents are in phase. This switching of the antennas is known as the Helmholtz principle.

With this design, the field lines of the opposite antenna planes 10 and 23 are superimposed to produce a total magnetic field. This has the result that the vectors of the magnetic fields of the two antennas add up within the gate, and this results in a significantly greater field intensity.

If a transponder requires a minimal field intensity of 100 mA/m (milliamperes per meter), for example, and if this minimal field intensity can still be measured at a distance of 60 cm, for example, in the case of a single antenna, the maximal range is also 60 cm. If two antennas are installed at a distance of 1.40 m, for example, with an area-parallel orientation to one another, and switched according to the Helmholtz principle, the read hole in the middle of the device closes. With a superimposition of the field lines, a field intensity of 160 mA/m results at a distance of 70 cm (gate center), from two times 80 mA/m, for example, and this is sufficient for operation of the transponder.

Figure 18:
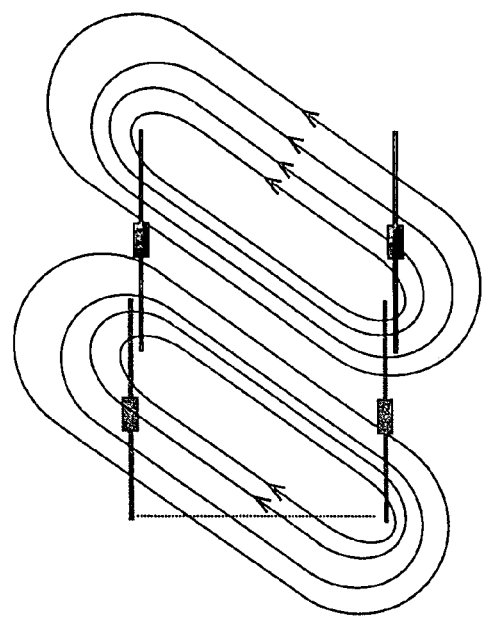
FIG. 18 shows a representation of a field line progression of a gate composed of antenna pairs that lie diagonally opposite one another.

FIG. 18 shows, for example, that one can activate the diagonally opposite antenna of the two planes of a gate via a multiplexer. With this result, communication is possible even with those transponders that are not oriented essentially area-parallel with the antenna array.

However, the effective field intensity in the center of the gate is reduced slightly, at a constant gate width and a constant output power of the RFID reader. This intensity is compared with the embodiment in which the directly opposite antennas are activated, since the field lines do not run precisely in the same direction. Superimposition of the field lines also occurs, but the field intensity values are not as great as described above.

If communication is also supposed to occur with transponders that are oriented orthogonal to the antenna area, there can be another embodiment of the antenna array, wherein a phase shift between the currents of the antennas of the first and the second plane amounts to 180 degrees, if these are connected with the reader at the same time.

Figure 19:
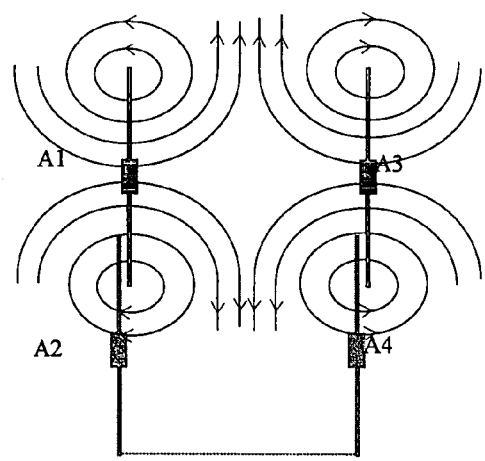
FIG. 19 shows a side view of a field line progression of a gate array of antenna pairs that lie opposite and overlap one another.
Figure 20:
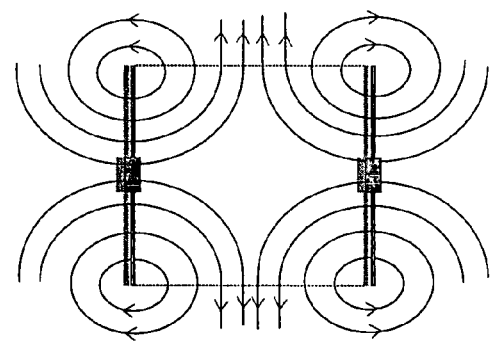
FIG. 20 shows a top view of a field line progression of a gate array of antenna pairs that lie opposite and overlap one another.

The resulting field progression is shown in FIGS. 19 and 20 and is generally referred to as anti-Helmholtz principle. FIG. 19 shows the side view, and FIG. 20 shows the top view.

To take equal advantage of the Helmholtz principle and the anti-Helmholtz principle, for example, to compensate for their specific disadvantages, the current is changed over, in another embodiment, via the antenna loops, constantly and at high frequency (more than 100 times per second), for example by means of a multiplexer. This changeover occurs so that the magnetic field of the antenna array constantly alternates between the Helmholtz principle and the anti-Helmholtz principle.

Subsequently, the two configurations can also be implemented on the next antenna pair of each plane of the gate.

The phase shift can occur, for example, using a phase shifter, coaxial cable, or by switching the polarity of the two leads of the antenna cable.

Switching between the Helmholtz principle and the anti-Helmholtz principle, between the two planes of the gate antenna array, can also occur via a 90 degree phase shifter, in another embodiment.

In this way, again, a resulting magnetic field is formed between the opposite antenna loops that are active, in each instance, of each plane of the antenna array. In this array the field constantly alternates between the Helmholtz principle and the anti-Helmholtz principle, at twice the frequency of the current.

Therefore, it is also possible to read transponders in two orientations.

Figure 21:
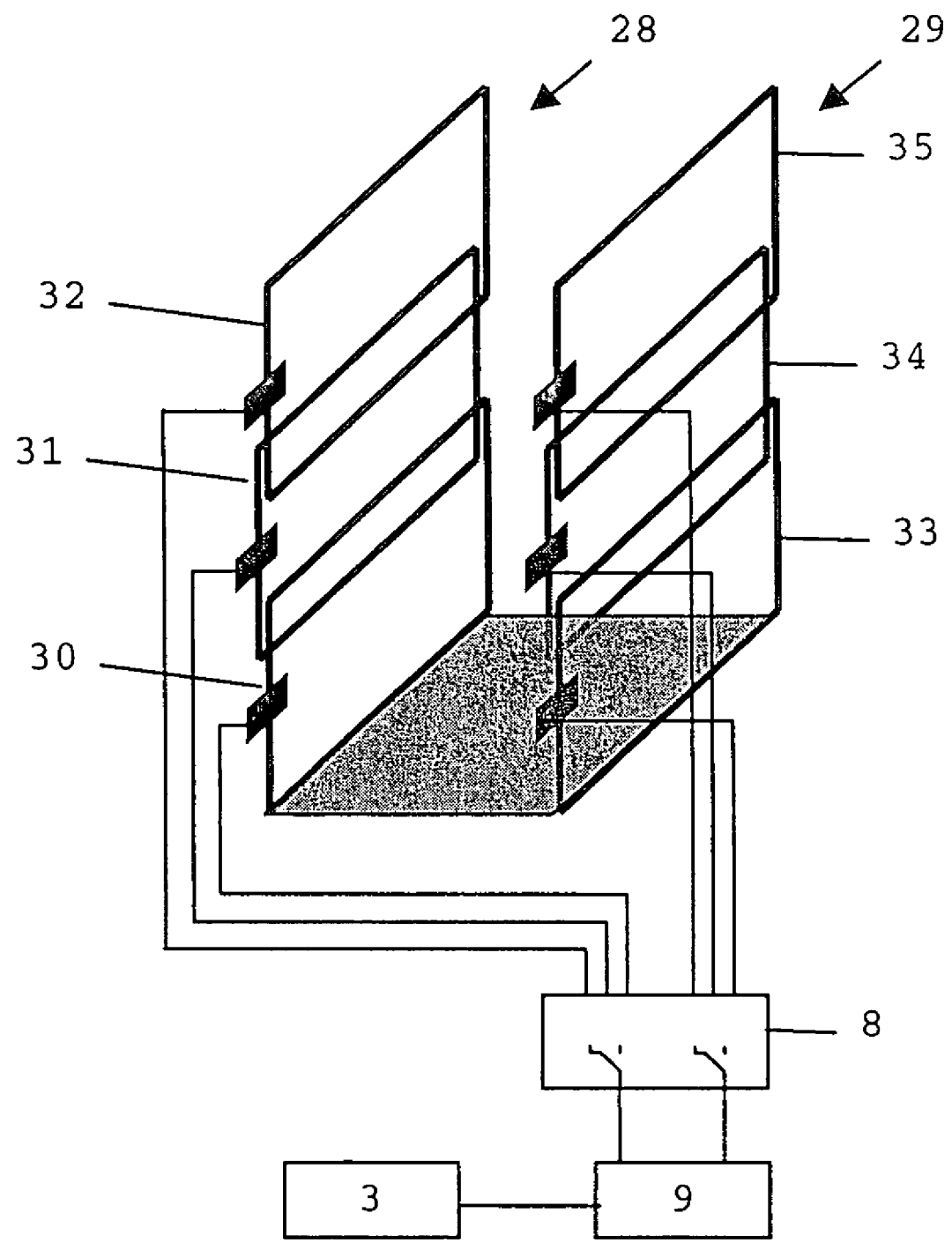
FIG. 21 shows a perspective view of a gate array of antenna pairs that lie opposite and overlap one another, with a multiplexer and power splitter.

FIG. 21 shows a design similar to FIG. 17a but these antenna arrays 28 and 29 have three antennas 30, 31, and 32; and 33, 34, and 35, in each instance.

Figure 22A:
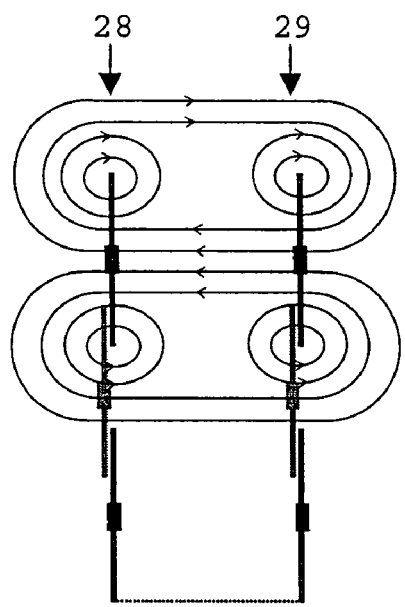
FIG. 22a shows a field line progression of the gate array shown in FIG. 21, for the same current direction.
Figure 22B:
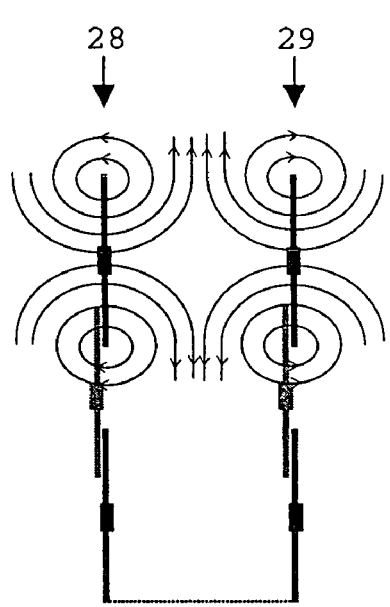
FIG. 22b shows a field line progression of the gate array shown in FIG. 21, for the opposite current direction.

FIG. 22a shows the field line progression of the antenna arrays 28 and 29 shown in FIG. 21, for the same current direction, and FIG. 22b shows it for the opposite current direction.

Figure 23A:
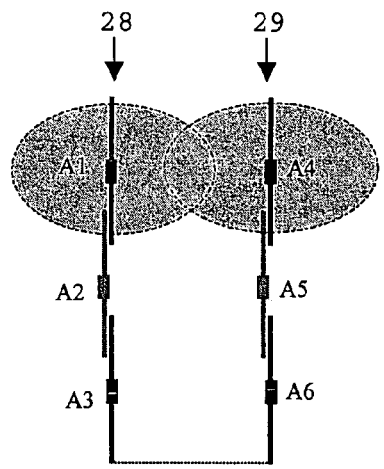
FIG. 23a shows a representation of the detection fields of the antennas of the gate array shown in FIG. 21.
Figure 23B:
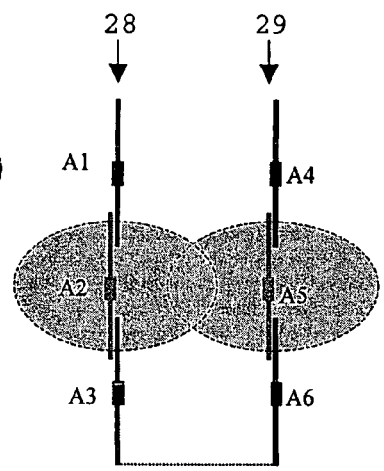
FIG. 23b shows a representation of the detection fields of the antennas of the gate array shown in FIG. 21.
Figure 23C:
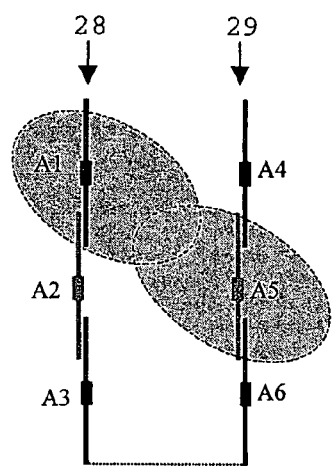
FIG. 23c shows a representation of the detection fields of the antennas of the gate array shown in FIG. 21.

FIG. 23a to 23c show the detection fields of antenna arrays 28 and 29 with the same current direction of the right and left antenna array 28 or 29. The antennas 30 to 35 are switched further in different ways, using multiplexer 8.

Figure 24A:
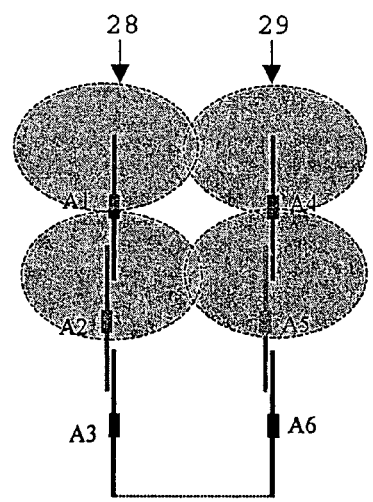
FIG. 24a shows a representation of the field lines as well as the detection/read regions of the gate array shown in FIG. 21.
Figure 24B:
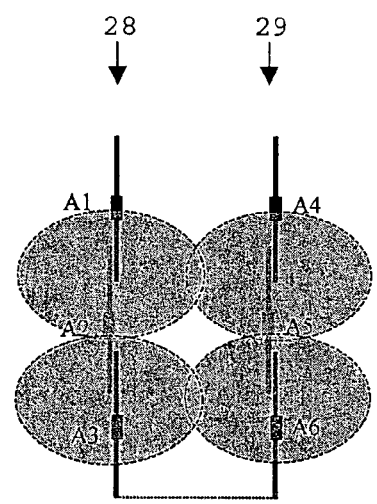
FIG. 24b shows a representation of the field lines as well as the detection/read regions of the gate array shown in FIG. 21.

FIGS. 24a and 24b show the detection fields of antenna arrays 28 and 29 with the opposite current direction of the right and left gate side of the antenna arrays 28 and 29 shown in FIG. 21, with a 180 degree phase shift. The field lines and the detection regions/read regions, as well as the label orientation 90 degrees to the antenna, are shown in FIGS. 24a and 24b.

All of the examples shown here can also be implemented with a larger number of antennas.

Accordingly, while many embodiments of the present invention have been shown and described, it is obvious that many changes and modifications may be made thereunto without departing from the spirit and scope of the invention.

REFERENCE NUMBERS 1 antenna
2 antenna
3 reader
3a standing wave ratio measuring device
4 antenna
5 switch
6 switch
7 switch
8 multiplexer
9 power splitter
10 antenna array
11 transponder
12 adaptation circuit
13 phase shifter
13' phase shifter
14 antenna
14' antenna
15 antenna
15' antenna
16 intersection point
17 intersection point
18 antenna
19 base body
20 symmetrical constriction
21 feed-in point
22 antenna
23 antenna array
24 antenna
25 antenna
26 antenna
27 antenna
28 antenna array
29 antenna array
30 antenna
31 antenna
32 antenna
33 antenna
34 antenna
35 antenna
36 antenna
a side
b side
c side
d side
e side
A position of the transponder
B position of the transponder
C position of the transponder
$I_1$ current
$I_3$ current
V voltmeter
Y reading distance
$Z_1$ time point
$Z_2$ time point
$Z_3$ time point

What is claimed is:

1. An antenna array for a RFID antenna having an operating frequency between 100 kHz and 30 MHz, which is coupled to at least one reader, comprising:
   a) at least one antenna system comprising at least two antennas each having at least one loop having at least one winding wherein said at least two antennas are disposed approximately in a plane and wherein said at least two antenna loops overlap at each other partially;
   b) at least one multiplexer disposed between said at least one reader and said at least one antenna system, wherein said at least one multiplexer is for selected activation of the antennas; and
   c) at least one device for opening an inactively switched antenna loop;
   wherein the antenna array is for communicating with a transponder, wherein said antenna loop has at least one side having an angle deviating from 0 degrees to 90 degrees relative to a movement direction of the transponder, and wherein the antenna loop has a pentagonal shape.

2. The antenna array as in clam 1, wherein only one antenna of said antenna array is activated at the same time.

3. The antenna array as in clam 1, wherein said antenna array comprises at least three antennas and at least one power splitter disposed between said at least one reader and said at least one antenna array, and wherein at least two antennas of said antenna array are activated at the same time.

4. The antenna array as in clam 3, wherein said antenna array comprises at least three antennas including at least two directly adjacent antennas that can be activated at the same time as an antenna group.

5. The antenna array as in clam 1, wherein said antenna loop has a rectangular shape with at least one constriction, wherein there are at least an odd number of constrictions and wherein said antenna further comprises a feed in point which is disposed in a symmetrical center of said antenna loop.

6. An antenna array for a RFID antenna having an operating frequency between 100 kHz and 30 MHz, which is coupled to at least one reader, comprising:
   a) at least one antenna system comprising at least two antennas each having at least one loop having at least one winding wherein said at least two antennas are disposed approximately in a plane and wherein said at least two antenna loops overlap at each other partially;
   b) at least one multiplexer disposed between said at least one reader and said at least one antenna system, wherein said at least one multiplexer is for selected activation of the antennas; and
   c) at least one device for opening an inactively switched antenna loop,
   wherein said antenna array comprises at least three antennas and at least one power splitter disposed between said at least one reader and said at least one antenna array, wherein at least two antennas of said antenna array are activated at the same time, and wherein a current in directly adjacent antennas has the same current direction.

7. An antenna array for a RFID antenna having an operating frequency between 100 kHz and 30 MHz, which is coupled to at least one reader, comprising:
   a) at least one antenna system comprising at least two antennas each having at least one loop having at least one winding wherein said at least two antennas are disposed approximately in a plane and wherein said at least two antenna loops overlap at each other partially;
   b) at least one multiplexer disposed between said at least one reader and said at least one antenna system, wherein said at least one multiplexer is for selected activation of the antennas; and
   c) at least one device for opening an inactively switched antenna loop,
   wherein said antenna array comprises at least three antennas including at least two directly adjacent antennas that can be activated at the same time as an antenna group, and at least one power splitter disposed between said at least one reader and said at least one antenna array, and wherein adjacent antenna groups can be activated one after the other, in each instance wherein a first antenna of a subsequent group corresponds to a last antenna of a previous group.

8. An antenna array for a RFID antenna having an operating frequency between 100 kHz and 30 MHz, which is coupled to at least one reader, comprising:
   a) at least one antenna system comprising at least two antennas each having at least one loop having at least one winding wherein said at least two antennas are disposed approximately in a plane and wherein said at least two antenna loops overlap at each other partially;
   b) at least one multiplexer disposed between said at least one reader and said at least one antenna system, wherein said at least one multiplexer is for selected activation of the antennas; and
   c) at least one device for opening an inactively switched antenna loop,
   wherein said antenna array comprises at least three antennas and at least one power splitter disposed between said at least one reader and said at least one antenna array, wherein at least two antennas are activated at the same time in each instance, and wherein at least one antenna is not activated between at least two remaining antennas, and wherein said activated antenna has a counter-phase current direction at least part of the time.

9. The antenna array as in clam 8, wherein at least two directly adjacent antennas of said at least three antennas are activated at least part of the time and have a same-phase current direction.

10. An antenna array for a RFID antenna having an operating frequency between 100 kHz and 30 MHz, which is coupled to at least one reader, comprising:
   a) at least one antenna system comprising at least two antennas each having at least one loop having at least one winding wherein said at least two antennas are disposed approximately in a plane and wherein said at least two antenna loops overlap at each other partially;
   b) at least one multiplexer disposed between said at least one reader and said at least one antenna system, wherein said at least one multiplexer is for selected activation of the antennas; and
   c) at least one device for opening an inactively switched antenna loop,
   wherein said antenna array comprises at least three antennas, and at least one power splitter disposed between said at least one reader and said at least one antenna array, wherein at least two antennas are activated at the same time, wherein at least one antenna is not activated between said at least two activated antennas, wherein the device further comprises a phase shifter which can shift a phase position of a current of a first antenna relative to a phase position of a current of a second antenna by an amount of 45 degrees to 135 degrees.

11. An antenna array for a RFID antenna having an operating frequency between 100 kHz and 30 MHz, which is coupled to at least one reader, comprising:
   a) at least one antenna system comprising at least two antennas each having at least one loop having at least one winding wherein said at least two antennas are disposed approximately in a plane arid wherein said at least two antenna loops overlap at each other partially;
   b) at least one multiplexer disposed between said at least one reader and said at least one antenna system, wherein said at least one multiplexer is for selected activation of the antennas; and
   c) at least one device for opening an inactively switched antenna loop,
   wherein said antenna array comprises a plurality of antennas including at least two antenna loops that are at least partially overlapping each other in a first plane but spaced apart from at least two other antennas including at least two antenna loops that are at least partially overlapping each other in a second plane, and wherein said antennas can be individually activated one after the other by said at least one multiplexer.

12. An antenna array for a RFID antenna having an operating frequency between 100 kHz and 30 MHz, which is coupled to at least one reader, comprising:
   a) at least one antenna system comprising at least two antennas each having at least one loop having at least one winding wherein said at least two antennas are disposed approximately in a plane and wherein said at least two antenna loops overlap at each other partially;

b) at least one multiplexer disposed between said at least one reader and said at least one antenna system, wherein said at least one multiplexer is for selected activation of the antennas; and c) at least one device for opening an inactively switched antenna loop, wherein said antenna array comprises at least two antenna loops that are at least partially overlapping each other in a first plane but spaced apart from each other, and wherein there are at least two additional at least partially overlapping antenna loops extending in a second plane, wherein said at least one antenna in said first plane and said at least one antenna in said second plane can be activated at the same time via at least one power splitter and said at least one multiplexer.

13. The antenna array as in clam 12, wherein said antenna disposed in said first plane has a current direction which is a same phase as said antenna disposed in said second plane.

14. The antenna array as in clam 12, wherein said antenna disposed in said first plane has a current direction which is in a counter-phase with said antenna disposed in said second plane.

15. The antenna array as in clam 12, wherein the current direction for said antennas can be switched so that said antenna in said first plane is in either a same phase or in a counter-phase with respect to said antenna in said second plane.

16. The antenna array as in clam 12, comprising a phase shifter, which can shift the phases between said antennas by between approximately 45 degrees and 135 degrees for continuous changing between the same current direction and opposite current direction.

* * * * *